July 11, 1950    H. R. MILLER ET AL    2,514,964
METHOD AND EQUIPMENT FOR TRACK MANUFACTURE
Filed Sept. 23, 1948    3 Sheets-Sheet 1

FIG. I

Inventors
Herman R. Miller
and Ralph W. Soki

By R H Waters

Attorney

Inventors
Herman R. Miller
and Ralph W. Sohl
By R H Waters
Attorney

Patented July 11, 1950

2,514,964

UNITED STATES PATENT OFFICE 2,514,964

METHOD AND EQUIPMENT FOR TRACK MANUFACTURE

Herman R. Miller and Ralph W. Sohl, Marshallville, Ohio, assignors to Wingfoot Corporation, Akron, Ohio, a corporation of Delaware Application September 23, 1948, Serial No. 50,854

16 Claims. (Cl. 154—3)

The present invention relates to the manufacture of endless band tracks for use on tractors and the like and which more recently have become advantageously employed on the landing gear of airplanes.

Previous methods of forming flexible endless band tracks of the present type were to form the band on a metal or other rigid form, then strip the band from the form and vulcanize in a flat press a section at a time which usually caused overcure at the ends of each section due to overlapping, or, build the band on a form, then strip and place in a mold provided with an expanding sectional metal core to apply pressure while vulcanizing the band.

Previous methods and equipment or apparatus used in the manufacture of band tracks of the present type required more floor space, the equipment used was heavy, more costly and difficult to handle resulting in a greater cost of producing the bands than does the present method and equipment.

It is the general object of the present invention to avoid and overcome the foregoing difficulties and objections of prior practices by the provision of a more efficient and less expensive method of producing flexible endless band tracks of the present type.

Another object is to provide a method and apparatus that will eliminate heavy equipment or apparatus and the laborious task of handling and moving same with a reduction in time and labor which will be reflected in lower cost of the product.

Another object of the invention is to provide a method and apparatus in which band tracks are molded with wire reinforcement plies under tension so that there will be little or no stretch when in service on a vehicle.

The aforesaid objects of the invention, and other objects which will become more apparent as the description proceeds, may be achieved by providing a resilient inflatable form of unusual dimensions which may be mounted on a split ring which, in turn, is mounted on a revolving chuck, partially inflating the form to give it stability, fabricating a band on the outer periphery of said form, then placing the form with the ring and band thereon in a mold, fully inflating the form, then subjecting the band to heat and pressure while under tension to vulcanize same, after which the form is removed from said mold and deflated, whereupon the band is easily removed from said form.

For a better understanding of the invention, reference should be had to the accompanying drawings wherein.

Figure 1:
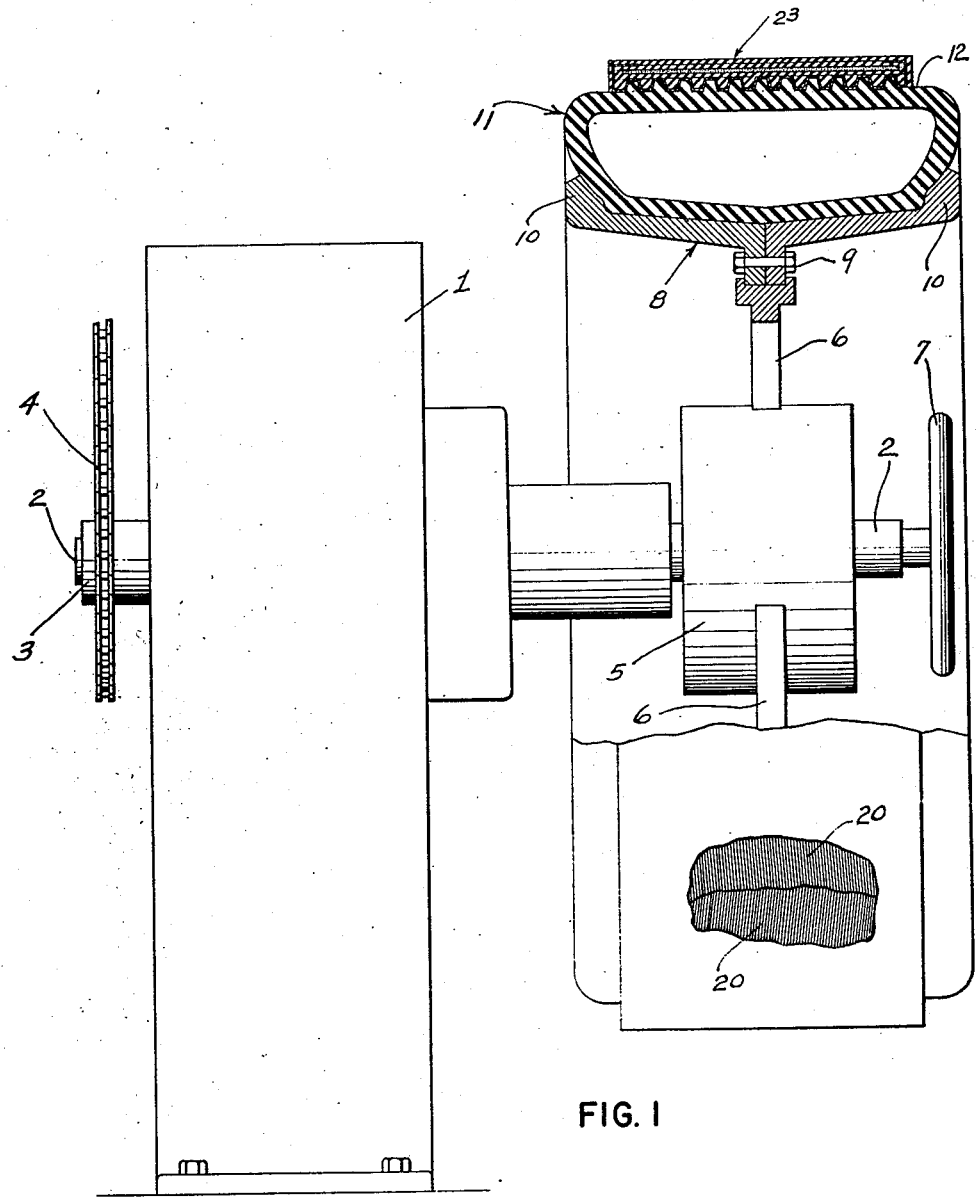
Figure 1 is a diagrammatic view showing the inflatable form mounted on a power driven chuck with a band fabricated thereon.

With reference to Figure 1 of the drawings, a conventional stand 1 supports a shaft 2 which is driven by a sprocket 3 and chain 4 connected to a source of power not shown. Supported on the shaft 2, a chuck 5 of conventional design has arms 6 capable of radial extension and retraction by the operation of the hand wheel 7 through the cooperation of a gear and pinions (not shown) in the body of said chuck.

Mounted on the arms 6 of the chuck 5 is a split ring 8 composed of a pair of mating halves bolted together by the bolts 9. The ring has retaining flanges 10 formed at the outer edges. The base is provided with a slight taper or flare on either side of the center line extending to the retaining flanges to aid in centering the inflatable form 11 thereon and to assure a central position in the mold.

The inflatable form or airbag 11 may be composed of rubber, synthetic rubber, fabric or the like, and is capable of expanding when inflated. The form is produced by tubing the main body portion from a tube machine, cutting the thus tubed stock to the proper length and splicing the ends. A strip of rubber of a compound which will be of a tougher and stiffer nature when vulcanized is applied to the outer periphery. This stiffer composition will give accuracy in molding the guiding ribs of the band track. The form or airbag is placed in a mold and vulcanized to its final circular shape.

Figure 2:
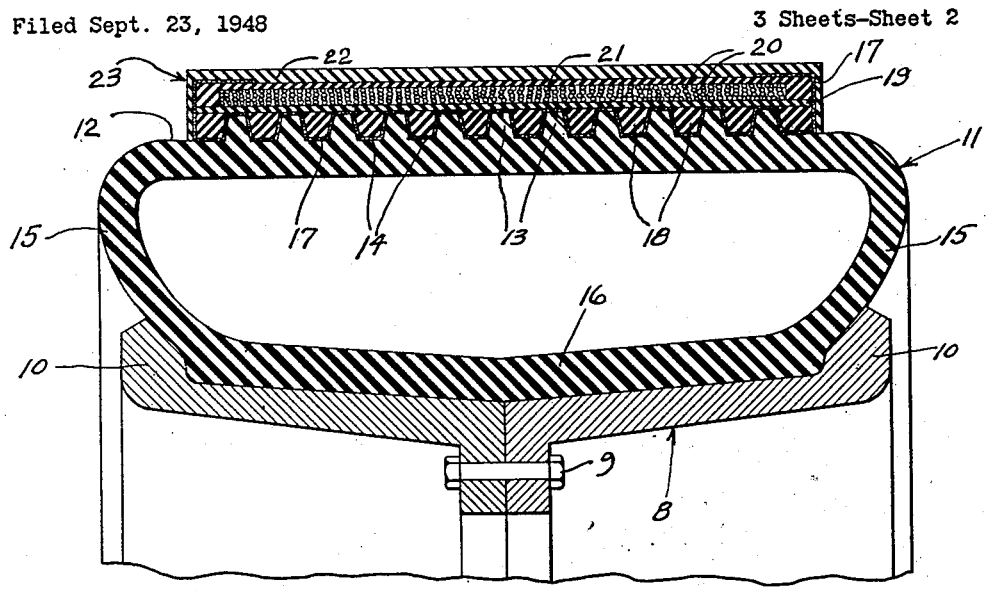
Figure 2 is an enlarged sectional view of the band and form mounted on the split ring.
Figure 3:
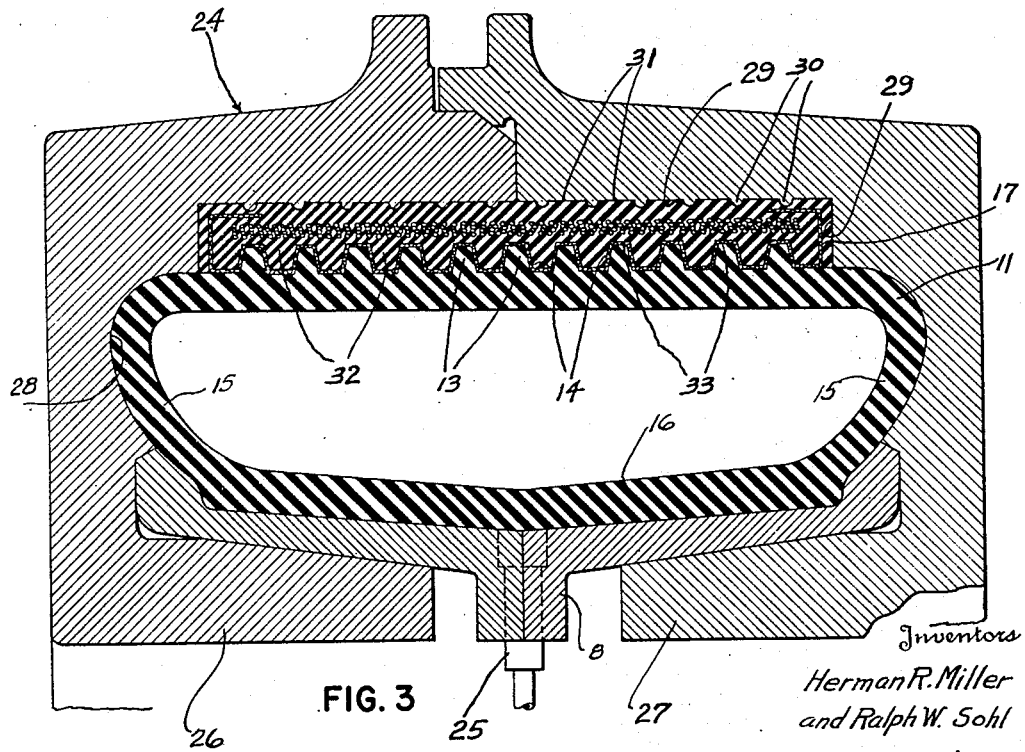
Figure 3 is a sectional view of a mold in which the form with the band thereon and supporting ring is positioned for vulcanizing the band.

The form, see Figs. 1, 2 and 3, is provided with a substantially flat outer periphery 12 having molded therein tapering ridges 13 and grooves 14 which are for the purpose of molding corresponding ribs and grooves in the band tracks to provide guiding ribs to retain the tracks on the wheels of a vehicle. The side walls 15 of the form are arcuate and more flexible than the peripheral portion to permit proper extension of the form when inflated in a mold during the process of vulcanizing the band. The base 16 of the form is somewhat thicker, rendering the base stiffer than the sidewalls to provide stability when mounting on the split ring 8, the base being tapered to correspond to the taper of the split ring for convenience in mounting and centering the form or airbag.

A band track is fabricated on the form or airbag in the following manner, the form 14 is mounted on a chuck as illustrated in Fig. 1 and partially inflated to a predetermined degree; fabric which may be a single sheet or a plurality of strips 17 is placed over the face of the form and stitched or rolled into the grooves and over the ridges, the fabric being of a width to permit the sides to overhang so that it will later extend over the sides and a portion of the upper surface of the band track. For certain bands it may be advantageous to omit the fabric 17. Strips of unvulcanized rubber 18 are rolled into the grooves to form the guiding ribs of the track, a sheet of rubber 19 is placed over the strips and stitched down, a plurality of plies of reinforcing elements comprising rubberized wire fabric 20 is centrally positioned over the rubber sheet 19, the rubberized fabric 20 is prepared in sheets cut so that the wire strands are at an angle with respect to the center line of the track, the various plies being alternately applied so that the strands of each ply cross the strands of each preceding ply as illustrated in Fig. 1. By applying the wire plies in this manner a slight amount of stretch of the band track is permitted in the mold when the airbag or form is inflated but the stretch of the band is negligible after being cured by vulcanization. A sheet of rubber 21 is placed over the plies of wire fabric and the loose sides of the fabric 17 are applied to the sides and a portion of the rubber sheet 21. A sheet of rubber 22 is then applied over the sides and top of the thus formed band and stitched down to finish the fabrication of the band track.

The split ring 8 with the form 14 and band track 23 thereon is removed from the chuck 5 and the assembly placed in a mold 24 (see Fig. 3). The form is inflated by admitting fluid under pressure through the valve stem 25 whereupon heat and pressure is applied to the mold to cure the band track by vulcanization.

The mold is composed of two mating halves 26 and 27 in which a cavity 28 is formed to correspond with and receive the inflatable form, said cavity being provided with an offset portion 29 to receive and mold the band track. The offset portion has ridges 30 and depressions 31 in its circumference to form the tread or ground contacting side of the tank track. The guiding ribs 32 and grooves 33 of the track are molded by the ridges 13 and grooves 14 of the inflatable form and form the guiding ribs on the wheel contacting side of the tracks.

The offset portion 29 of the mold may be provided with a greater diameter than the outside diameter of the fabricated band. This will permit the band to expand and be under tension when the form is inflated in the mold.

Figure 4:
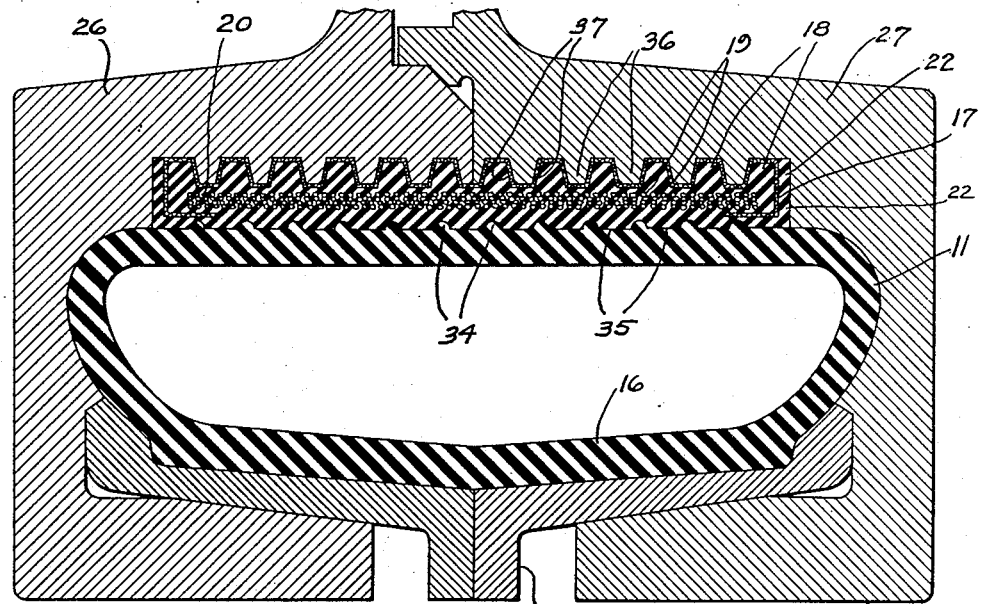
Figure 4 is a sectional view illustrating how the mold and form may be formed so that the band tracks may be formed and vulcanized inside out, then reversed after being removed from the mold.
Figure 5:
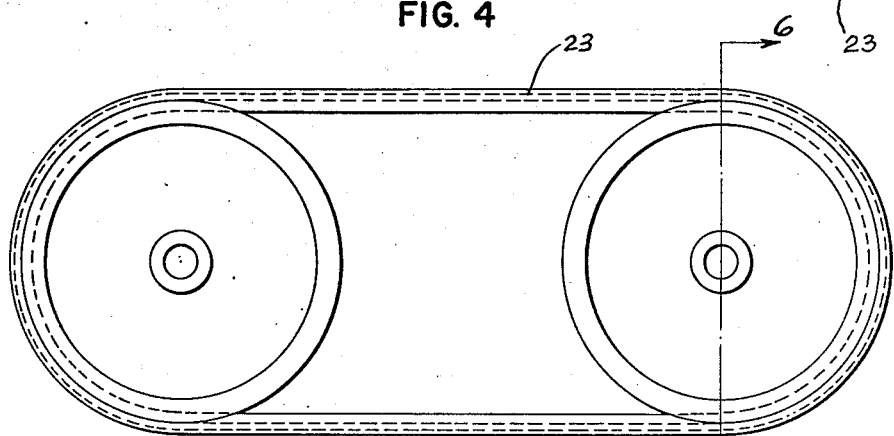
Figure 5 is a side view showing the finished band applied to wheels.
Figure 6:
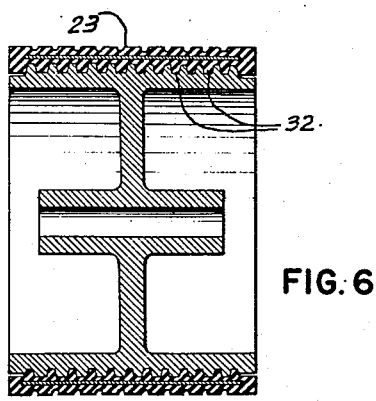
Figure 6 is a sectional view taken on the line 6—6 of Figure 5.

Figure 4 of the drawings illustrates a modified method of fabricating and molding the bands wherein the operations of assembling the various elements are reversed. This is accomplished by forming ridges 34 and depressions 35 which mold the tread or ground contacting side of the band track on the inflatable form 11. The ridges 36 and depressions 37 which form the band guiding ribs on the wheel contacting side are formed in the mold. By this method the band tracks will be molded inside out, then reversed when removed from the form.

In this method the elements used in fabricating the band tracks are the same as used in the foregoing described method but the sequence of application of the various elements is substantially reversed. The fabric over the guiding ribs is necessarily applied in strips.

From the foregoing illustrations and description, it has been disclosed how a method and the equipment employed therein may be utilized to manufacture endless band tracks with economy and precision, which will provide tracks that will give long troublefree wear at less cost than heretofore accomplished.

While certain representative embodiments and details have been shown for purpose of illustrating the invention, it will be apparent to those skilled in the art that various changes and modifications may be made therein without departing from the spirit or scope of the invention.

We claim:

1. The method of making flexible endless band tracks comprising forming and molding a flexible inflatable form having a wide flat outer periphery with ridges and depressions formed thereon to form a design on one side of the track, mounting the form on a split ring, mounting the ring on a chuck, partially inflating the flexible form to a predetermined degree, forming a band thereon by placing one or more plies of fabric into said depressions and over said ridges, said fabric being of a width to provide extending free edges, placing strips of rubber over said fabric in said depressions, placing a sheet of rubber over said strips and the exposed fabric over said ridges, applying a plurality of plies of reinforcing elements over the rubber sheet, applying a sheet of rubber over said reinforcing elements, applying the extending fabric to the sides and a portion of the top of the band, applying a third sheet of rubber over the sides and top of said band to complete the band track, placing the entire assembly including the ring and form in a mold and subjecting the band track to heat and pressure to vulcanize the band track under tension created by the inflatable form.

2. The method of manufacturing flexible endless band tracks comprising the following steps, forming a flexible inflatable form, mounting said form on a ring, fabricating the band track on said form, placing the assembly in a mold and subjecting the band track to heat and pressure to vulcanize same while under tension.

3. The method of manufacturing endless band tracks for tractors comprising the following steps, preparing a flexible inflatable form, mounting said form on a pair of mating rings, mounting the rings on a chuck, fabricating the band track on said form, removing the assembly from said chuck, placing the assembly in a mold and subjecting the band track to heat and pressure to vulcanize same while under tension.

4. The method of manufacturing endless band tracks for tractors comprising the following steps, forming a flexible inflatable form, mounting said form on a pair of mating rings, mounting the rings on a chuck, fabricating the band track on said inflatable form, removing the assembly from said chuck, placing the assembly in a mold, inflating said inflatable form, and subjecting the band track to heat and pressure to vulcanize same while mounted on said inflatable form.

5. The method of making endless band tracks for tractors comprising forming an inflatable form having a substantially flat periphery and a wide base, mounting the inflatable form on a ring, mounting said ring on a chuck, inflating said inflatable form to a predetermined degree, fabricating a band track on the outer flat periphery of said form, placing the above recited assembly in a mold and subjecting said band track to heat and pressure to vulcanize said band track while under tension.

6. The method of making endless band tracks comprising forming an inflatable form having a wide flat outer face, mounting the form on a split ring, mounting the ring on a chuck, partially inflating said form, forming an endless band on the wide face of said form, placing the assembly in a mold, inflating said form to the proper molding pressure and subjecting said band to heat and pressure to vulcanize the same under tension.

7. The method of forming and molding endless bands composed of rubber and fabric having strands of reinforcing material embedded therein, comprising forming an inflatable flexible form, mounting the form on a pair of mating rings, said rings being bolted together, partially inflating the flexible form, forming the endless band on the outer periphery of said inflatable flexible form, placing the thus formed band and form in a mold, further inflating said form to subject the band to pressure and heating said band to vulcanize the same while under tension due to the expansion of said inflatable form.

8. The method of producing flexible endless bands, comprising forming a resilient inflatable form, mounting the form on a pair of mating rings, mounting said rings on a chuck, partially inflating said inflatable form, forming the endless band on the outer periphery of the inflatable form, placing the assembly in a mold, inflating the resilient form to molding pressure, and applying heat and pressure to said band to vulcanize the same while under tension created by the resilient inflatable form.

9. The method of forming and molding flexible endless band tracks comprising forming a resilient inflatable form, mounting said form on a pair of mating rings, mounting said rings on a chuck, partially inflating the inflatable form, forming the band track on the outer periphery of said form, enclosing the assembly in a mold, inflating the form to molding pressure, subjecting the band track to heat and pressure to vulcanize the same, deflating said form, removing the assembly from the mold and stripping the band track from the resilient inflatable form.

10. The method of curing endless band tracks comprising the steps of forming a band on the exterior of an inflated form and, while still mounted on said form, enclosing the band and form in a mold and curing said band.

11. An apparatus for forming and vulcanizing flexible band tracks, comprising an inflatable building form on which the band track is fabricated, a mold having a cavity therein in which said band track is vulcanized while on said inflatable form and a pair of mating rings for supporting said inflatable form outside the mold while the band track is being formed and for supporting same inside the mold while the band track is being vulcanized.

12. An apparatus for forming and vulcanizing flexible band tracks, comprising an inflatable building form on which the band track is fabricated, a mold having a cavity therein in which said band track is vulcanized while on said inflatable form, a pair of mating rings for supporting said inflatable form outside the mold while the band track is being formed and inside the mold while the band track is being vulcanized, and ridges on said mold extending into said mold cavity to form a design on one side of the band track and ridges extending from said inflatable form to form a design on the opposite side of said band.

13. An apparatus for forming and vulcanizing flexible band tracks, comprising an inflatable building form on which the band track is fabricated, a mold having a cavity therein in which said band track is vulcanized while on said inflatable form, a pair of mating rings for supporting said inflatable form outside the mold while the band track is being formed and inside the mold while the band track is being vulcanized, and ridges extending from said inflatable form to form guiding ribs on said band track.

14. An apparatus for forming and vulcanizing flexible band tracks, comprising an inflatable building form on which a band is fabricated, a mold having a cavity therein in which said band is vulcanized while on said inflatable form, a ring for supporting said inflatable form outside the mold while the band is being formed and inside the mold while the band is being vulcanized and ridges extending from said inflatable form to form a design on the adjacent side thereto.

15. Equipment for forming and vulcanizing flexible band track comprising a flexible inflatable form on which a band is fabricated, a mold having a cavity therein, a ring to support said inflatable form while it is both outside and inside of said mold, said inflatable form having a wide flat outer periphery with ridges and depressions formed therein to form a design in the band track, arcuate sidewalls, and having cross sectional dimensions such that the width is greater than the height.

16. The method of curing endless flexible bands comprising the steps of forming a band on the outer periphery of a flexible form and while still mounted on said form enclosing the band and form in a mold inflating said form and curing said band thereon.

HERMAN R. MILLER.
RALPH W. SOHL.

REFERENCES CITED

The following references are of record in the file of this patent:

UNITED STATES PATENTS

| Number | Name | Date |
| --- | --- | --- |
| 1,510,449 | Brucker | Sept. 30, 1924 |
| 1,633,587 | Kilborn et al. | June 28, 1927 |
| 2,363,933 | Bendix | Nov. 28, 1944 |